United States Patent
Johnson et al.

(10) Patent No.: US 9,921,960 B2
(45) Date of Patent: Mar. 20, 2018

(54) METHOD AND SYSTEM FOR DEFERRING SYSTEM DUMP

(71) Applicant: Oracle International Corporation, Redwood Shores, CA (US)

(72) Inventors: Darrin P. Johnson, San Jose, CA (US); Vladimir Kotal, Prague (CZ); Brian Ruthven, Berkshire (GB); Christopher Beal, Berkshire (GB)

(73) Assignee: Oracle International Corporation, Redwood Shores, CA (US)

( * ) Notice: Subject to any disclaimer, the term of this patent is extended or adjusted under 35 U.S.C. 154(b) by 280 days.

(21) Appl. No.: 14/338,315

(22) Filed: Jul. 22, 2014

(65) Prior Publication Data

US 2016/0026545 A1 Jan. 28, 2016

(51) Int. Cl.
*G06F 12/06* (2006.01)
*G06F 11/07* (2006.01)
*G06F 11/14* (2006.01)

(52) U.S. Cl.
CPC .......... *G06F 12/06* (2013.01); *G06F 11/0706* (2013.01); *G06F 11/0778* (2013.01); *G06F 11/1417* (2013.01); *G06F 2212/1032* (2013.01); *G06F 2212/251* (2013.01)

(58) Field of Classification Search
CPC ................................................ G06F 11/0778
See application file for complete search history.

(56) References Cited

U.S. PATENT DOCUMENTS

| | | | |
|---|---|---|---|
| 6,681,348 B1 * | 1/2004 | Vachon | G06F 11/0778 714/38.11 |
| 8,576,237 B2 | 11/2013 | Fujinuki et al. | |
| 2005/0228769 A1 * | 10/2005 | Oshima | G06F 11/0706 |
| 2011/0173426 A1 * | 7/2011 | Moore | G06F 11/2284 713/2 |

* cited by examiner

*Primary Examiner* — Gary W. Cygiel
(74) *Attorney, Agent, or Firm* — FBFK PC

(57) ABSTRACT

A method for performing a deferred system dump includes storing a preservation list referencing physical memory addresses allocated to pages by an initial operating system executing on a computer system. The method further includes identifying a subset of the pages that are at least partially allocated below a first physical memory address, relocating the subset to new physical memory addresses above the first physical memory address, and updating the preservation list with the new physical memory addresses. The method further includes transferring control of the computer system from the initial operating system to a subsequent operating system. The subsequent operating system accesses the preservation list to identify preserved pages. The method further includes assigning each of the preserved pages to an address segment in an address space of the subsequent operating system, storing a subset of the preserved pages, and freeing the preserved pages.

18 Claims, 3 Drawing Sheets

METHOD AND SYSTEM FOR DEFERRING SYSTEM DUMP

BACKGROUND

Modern computer servers can have terabytes of physical memory. When a system panics and there is a desire to collect diagnostic information, the process of dumping physical memory to a file system can be very time intensive. The resulting downtime can have significant impact on a business's bottom line. Consequently, some server owners eschew fault diagnosis in favor of shorter downtime, a decision that may lead to more costly system failure down the road.

SUMMARY

In general, in one aspect, the invention relates to a method for performing a deferred system dump, including storing a preservation list referencing physical memory addresses allocated to pages by an initial operating system executing on a computer system. The method further includes identifying a subset of the pages that are at least partially allocated below a first physical memory address, relocating the subset to new physical memory addresses above the first physical memory address, and updating the preservation list with the new physical memory addresses. The method further includes transferring control of the computer system from the initial operating system to a subsequent operating system. The subsequent operating system accesses the preservation list to identify preserved pages. The method further includes assigning each of the preserved pages to an address segment in an address space of the subsequent operating system, storing a subset of the preserved pages, and freeing the preserved pages.

In general, in one aspect, the invention relates to a computer system including a processor and an initial operating system executing on the processor and configured to store a preservation list referencing physical memory addresses allocated to pages. The initial operating system is further configured to identify a subset of the pages that are at least partially allocated below a first physical memory address, relocate the subset to new physical memory addresses above the first physical memory address, update the preservation list with the new physical memory addresses, and transfer control of the computer system. The computer system further includes a subsequent operating system executing on the processor and configured to receive control of the computer system, access the preservation list to identify preserved pages, assign each of the preserved pages to an address segment in an address space of the subsequent operating system, store a subset of the preserved pages, and free the preserved pages.

In general, in one aspect, the invention relates to a non-transitory computer readable medium for performing a deferred system dump including instructions for storing a preservation list referencing physical memory addresses allocated to pages by an initial operating system executing on a computer system. The computer readable medium further includes instructions for identifying a subset of the pages that are at least partially allocated below a first physical memory address, relocating the subset to new physical memory addresses above the first physical memory address, and updating the preservation list with the new physical memory addresses. The computer readable medium further includes instructions for transferring control of the computer system from the initial operating system to a subsequent operating system. The subsequent operating system accesses the preservation list to identify preserved pages. The computer readable medium further includes instructions for assigning each of the preserved pages to an address segment in an address space of the subsequent operating system, storing a subset of the preserved pages, and freeing the preserved pages.

Other aspects of the invention will be apparent from the following description and the appended claims.

DETAILED DESCRIPTION

Figure 1:
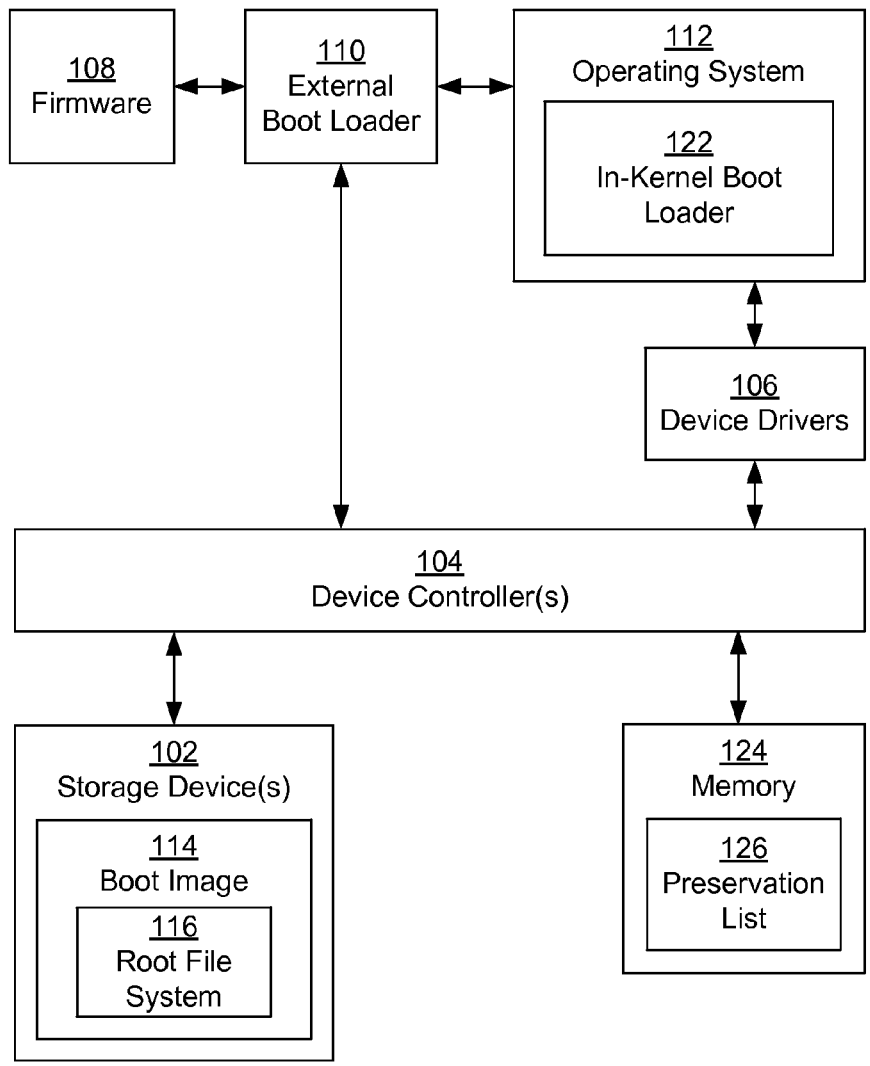
FIG. 1 shows a schematic diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to a computer's initial operating system detecting a fatal error, reallocating memory to preserve diagnostic data, and transferring control of the computer to a subsequent operating system. The memory is reallocated in order to preserve the diagnostic data from being overwritten by the subsequent operating system while booting. The subsequent operating system may then perform a deferred system dump (i.e., core dump) using the preserved data.

FIG. 1 shows a schematic diagram of a system in accordance with one or more embodiments of the invention. As shown in FIG. 1, the system (100) may have multiple components including a storage device (102), device controllers (104), device drivers (106), firmware (108), an external boot loader (110), an operating system (112), and memory (124). Each of these components is described below.

In one or more embodiments of the invention, the storage device (102) is a hardware device on which operating system files are located. For example, the storage device may be a hard disk drive, flash memory, a floppy disk, a compact disk, a networked storage server, or any other type of hardware or combination thereof that is used for storage. Further, the storage device may be partitioned. In such a scenario, multiple operating systems may exist on a single storage device, each in a separate partition. Although FIG. 1 shows a single storage device, the system may include or be operatively connected to multiple storage devices. The multiple storage devices may be of heterogeneous types.

In one or more embodiments of the invention, the storage device (102) includes a boot image (114). A boot image is a representation of an operating system as viewed by a boot loader (e.g., an external boot loader (110), and an in-kernel boot loader (112) (both described below)). The boot image includes a root file system (116).

In one or more embodiments of the invention, the root file system (116) is the initial file system on which other file systems may be mounted. A file system is an organization mechanism for the storage and retrieval of files. The root file system stores files for the operating system.

Although FIG. 1 shows a single boot image (114) and a single root file system (116), multiple boot images, each having a corresponding root file system, may exist. Specifically, the system may include multiple possible operating systems for execution. In one or more embodiments of the invention, the multiple possible operating systems may be different versions of the same operating system and/or may correspond to operating systems from different vendors. In one or more embodiments of the invention, the initial operating system and the subsequent operating system may be obtained from the same boot image or may be obtained from different boot images.

In one or more embodiments of the invention, a device controller (104) is a hardware component that provides a translation between the processor(s) (e.g., central processing unit(s)) (not shown) on the computer system and the storage device (102). Specifically, the device controller is an interface between the processor and the storage device(s). Further, the device controller includes functionality to transfer data between the storage device(s) connected to the device controller and components of the computer system, such as memory (124) and the processor(s).

In one or more embodiments of the invention, the device controller (104) is connected to a device driver (106). The device driver is a software program that provides an interface between the operating system (112) and the device controller. Specifically, in order for the operating system to retrieve from or store data to the storage device (102), the operating system may invoke a routine in the device driver. In response, the device driver issues commands to the storage device via the device controller. The device controller sends the commands to the device. The type of device driver used may be dependent upon the hardware device and the operating system. In one or more embodiments of the invention, the device driver for the storage device is loaded when the operating system is loaded.

In one or more embodiments of the invention, the firmware (108) is a program in a fixed memory address that starts when power is provided to the computer system. The firmware includes the initial program executed by the processor. For example, the firmware may be a basic input/output system (BIOS), extensible firmware interface (EFI), and/or other types of firmware.

In one or more embodiments of the invention, the firmware (108) includes functionality to initiate execution of an external boot loader (110). The external boot loader may be a part of the firmware, or the external boot loader may be stored separately from the firmware. The external boot loader includes functionality to start the execution of an operating system (112).

In one or more embodiments of the invention, the external boot loader (110) includes functionality to initiate execution of the kernel of the operating system (112). The kernel of the operating system is a protected portion of the operating system. The kernel of the operating system includes functionality to identify the location of the root file system (116) and mount the root file system from the identified location.

In one or more embodiments of the invention, the operating system (112) includes functionality to detect a fatal system error (i.e., fatal error or stop error). A fatal error is an unexpected condition, result, signal, or datum that prevents the operating system from continuing to operate safely. After detecting a fatal error, the operating system may execute a kernel routine called a kernel panic. Depending on the operating system, a kernel panic may include functionality to halt some or all system activity, output error messages to a user console, perform a system dump, and/or initiate a soft or hard reboot.

In one or more embodiments of the invention, the operating system (112) includes an in-kernel boot loader (122). The in-kernel boot loader is a boot loader that executes in the execution environment provided by the operating system. The in-kernel boot loader includes functionality to execute, at least in part, while other services of the operating system are executing. Specifically, the in-kernel boot loader may initiate the execution of a kernel of a subsequent operating system while other processes of the initial operating system are still executing. The in-kernel boot loader includes functionality to transfer control of the computer system to the subsequent operating system.

In one or more embodiments of the invention, the operating system (112) includes functionality to write to and read from memory (124) and the storage device(s) (102). Specifically, the operating system may include functionality to generate a preservation list (126) (described below), store the preservation list in memory (124), and/or update the preservation list. The operating system may generate a preservation list as part of a panic code.

In one or more embodiments of the invention, the preservation list (126) stores references to physical memory addresses and offsets corresponding to data (e.g., pages, metadata, page tables, frame tables, symbol tables, etc.) desired to be preserved from overwrite (e.g., by a subsequent operating system). For example, and without limitation, the preservation list may reference data corresponding to the state of the computer system when a fatal error is detected, as such data may be valuable for diagnostic purposes. In one or more embodiments of the invention, the preservation list specifies memory ranges for which a subsequent operating system needs to perform a system dump, before the subsequent operating system can allocate the memory for its own use.

In one or more embodiments of the invention, the initial operating system may include functionality to pass a reference to the preservation list to the subsequent operating system. The reference to the preservation list may be a physical memory address reference passed as an argument on the boot command line executed by the in-kernel boot loader. In one or more embodiments of the invention, the physical memory address of the preservation list may be retained in an address space of the initial operating system and then discovered by the subsequent operating system, for example, by executing a hypervisor call.

In one or more embodiments of the invention, the operating system (112) includes functionality to perform data analysis on pages in memory in order to determine what data is necessary for inclusion in a system dump. For example, such analysis may include thread deep probing, lock deep probing, panic exclusion, panic data attenuation, etc. These analyses are discussed in further detail below with respect to FIG. 2.

In one or more embodiments of the invention, the memory (124) is a device directly accessible by a processor (not shown), for storing data. For example, the memory may be dynamic random access memory (DRAM), non-volatile dynamic random access memory (NVDRAM), cache memory, flash memory, and/or other forms of memory.

While FIG. 1 shows a configuration of components, other configurations may be used without departing from the scope of the invention. For example, various components may be combined to create a single component. As another example, the functionality performed by a single component may be performed by two or more components.

Figure 2:
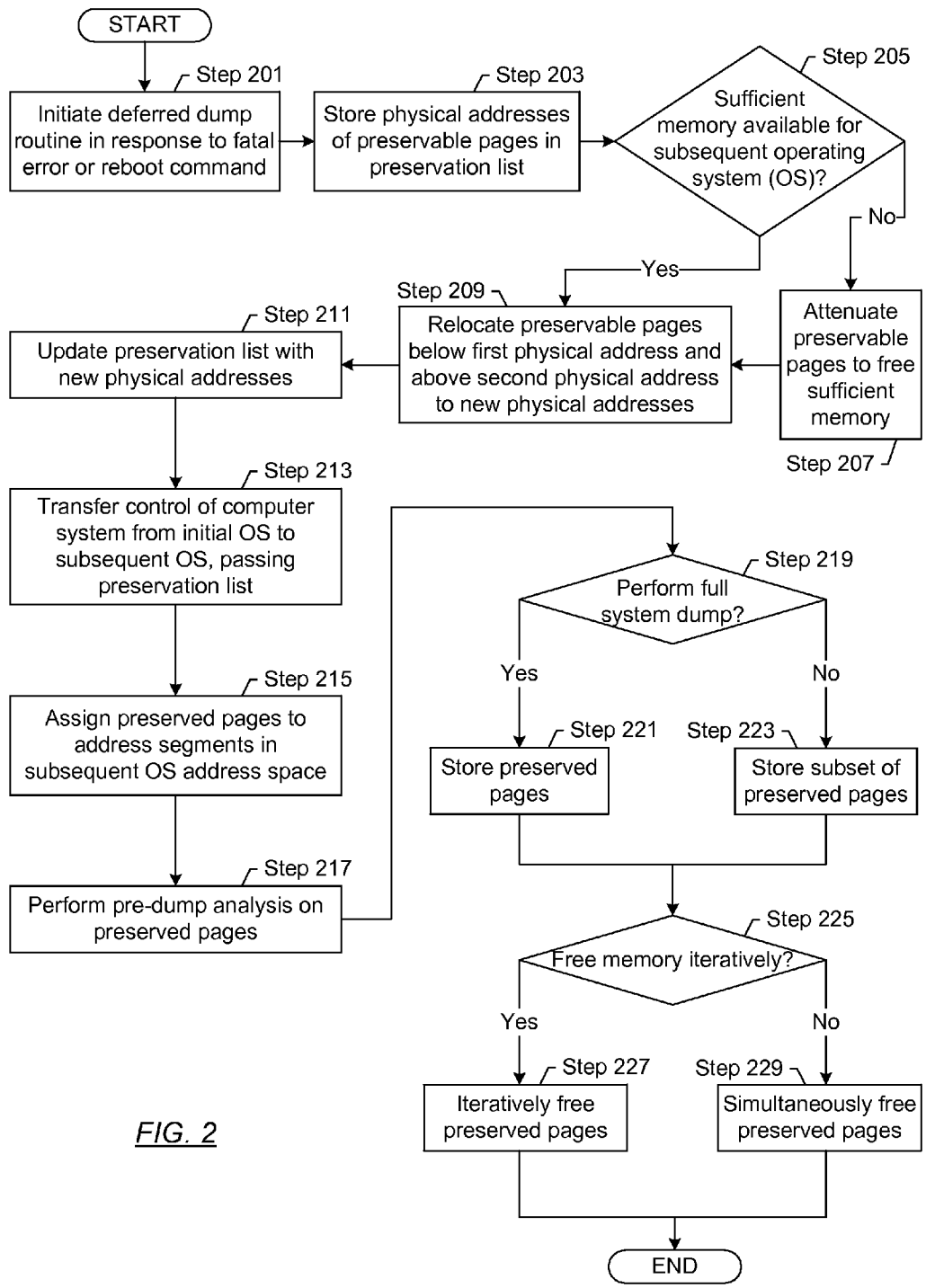
FIG. 2 shows a flowchart in accordance with one or more embodiments of the invention.

FIG. 2 shows a flowchart for performing a deferred dump in accordance with one or more embodiments of the invention. In Step 201, a deferred dump routine is initiated in response to the initial operating system detecting a fatal error or receiving a reboot and dump command (e.g., "reboot-d") from a user. In one or more embodiments of the invention, as part of the deferred dump routine, the in-kernel boot loader of the initial operating system loads the boot image for the subsequent operating system. The boot image for the subsequent operating system may be loaded into memory during execution of the initial operating system and before a fatal error is detected or a reboot command is received. The section of memory in which the boot image is loaded may be reserved for the subsequent operating system. By preloading a boot image, if a sudden failure of the initial operating system occurs, then execution may quickly switch to the subsequent operating system.

In Step 203, physical addresses and offsets corresponding to pages to be preserved ("preservable pages") are stored in a preservation list. In one or more embodiments of the invention, if a fatal error has been detected, the preservable pages may be determined by the initial operating system based on the type of fatal error that occurred. If a reboot command is received, the preservable pages may be specified by the user.

In Step 205, a determination is made regarding whether sufficient memory for the subsequent operating system is available. Specifically, sufficient memory may exist when the subsequent operating system may begin execution of initial services using memory that is not already allocated to the initial operating system and/or to preservable pages. In one or more embodiments of the invention, memory is reserved during the execution of the initial operating system to ensure that sufficient memory is available for the subsequent operating system. If it is determined that sufficient memory for the subsequent operating system is not available, then the process proceeds to Step 207. If it is determined that sufficient memory for the subsequent operating system is available, then the process proceeds to Step 209.

In Step 207, it has been determined that sufficient memory for the subsequent operating system is not available, and accordingly, the preservable pages are attenuated in order to free sufficient memory. In one or more embodiments of the invention, preservable pages are attenuated by performing an immediate partial system dump using a subset of the preservable pages. Specifically, the initial operating system begins storing preservable pages to a storage device so that the pages no longer require preservation and can be removed from the preservation list (and thus the corresponding memory ranges are made available to the subsequent operating system). In one or more embodiments of the invention, preservable pages are attenuated by making a determination that some pages are unneeded for fault diagnosis. Once the determination has been made, unneeded pages may be removed from the preservation list and/or freed from memory. Once sufficient memory is available for the subsequent operating system, the process proceeds to Step 209.

In Step 209, preservable pages fully or partially allocated below a first physical memory address are relocated (i.e., copied or reallocated) to new physical memory addresses above the first physical memory address. In one or more embodiments of the invention, the first physical memory address has a predetermined value. For example, the first physical memory address may correspond to a 1 gigabyte (1 GB) offset from the top physical memory address. In one or more embodiments of the invention, preservable pages fully or partially allocated above a second physical memory address are relocated to new physical memory addresses below the second physical memory address and above the first physical memory address. In one or more embodiments of the invention, the second physical memory address is predetermined. The second physical memory address may be predetermined in proportion to the entire physical address space. For example, the second physical memory address may be set to bound the last 5% of physical memory.

In Step 211, the preservation list is updated with new physical addresses for the preservable pages that were relocated according to the previous step. In one or more embodiments of the invention, the preservation list is stored after preservable pages are relocated according to Step 209, in which case no update is necessary.

In Step 213, control of the computer system is transferred from the initial operating system to the subsequent operating system. Specifically, the in-kernel boot loader starts the initial routine in the boot image of the subsequent operating system executing on the processor. In one or more embodiments of the invention, the initial operating system passes a reference to the preservation list to the subsequent operating system. The subsequent operating system may then access the preservation list to identify memory ranges (corresponding to preservable pages, now "preserved pages") that are unavailable for allocation by the subsequent operating system.

In Step 215, preserved pages are assigned to address segments in the address space of the subsequent operating system. In one or more embodiments of the invention, a data structure is created by the kernel of the subsequent operating system, and preserved pages are attached to the data structure in the kernel's address space. In this manner, preserved pages may be protected from overwrite by the normal memory allocation of the subsequent operating system's boot process.

In Step 217, a pre-dump analysis is performed on the preserved pages. The analysis may be used to determine which of the preserved pages are necessary for the system dump. The analysis may include thread deep probing, lock deep probing, panic exclusion, panic data attenuation, etc. In thread deep probing, a threadlist, stacks of threads, or other metadata may be extracted from the memory resident system image prior to dump, allowing for root cause or other type of analysis to potentially eliminate the need for dumping higher fidelity information.

In lock deep probing, in the case of hangs, locks may be examined and lock ownership may be traced back to a blocked thread, again allowing for potential exclusion from system dump. In panic exclusion, panic duplicates are identified to exclude the need for offload and/or analysis of duplicate panics, or to provide typing of dumps. Panic exclusion may include signature matching, fuzzy matching, Bayesian matching, etc. In panic data attenuation, characteristics of a system panic may be analyzed to allow discarding non-critical information from analysis or dumping. The invention is not limited to the analyses described with respect to Step 217.

In Step 219, a determination is made regarding whether a full system dump is required. The determination may be made as a function of the analysis or analyses executed according to Step 217. For example, without limiting the scope of the invention, if a panic duplicate is identified, the system may already possess relevant diagnostic information from previous system dumps, and a full system dump may not be required.

In Step 221, it has been determined that a full system dump is required. Accordingly, the subsequent operating system stores all preserved pages on a storage device. In one or more embodiments of the invention, the subsequent operating system writes all preserved pages to the storage device as one continuous process.

In Step 223, it has been determined that a full system dump is not required. Specifically, the subsequent operating system has determined that it may perform a partial system dump. Accordingly, the subsequent operating system writes a subset of the preserved pages to a storage device. In one or more embodiments of the invention, the subsequent operating system may delete references to unneeded preserved pages from the preservation list prior to storing the remaining referenced pages to the storage device. In addition, or alternatively, the subsequent operating system may free all memory corresponding to unneeded preserved pages prior to storing the remaining preserved pages to the storage device.

In Step 225, a determination is made regarding whether to free the preserved pages from memory iteratively or simultaneously. The determination may be made based on such considerations as performance and reliability. If the preserved pages are freed iteratively, the corresponding memory may be made available to the subsequent operating system more quickly. If the preserved pages are freed simultaneously, it may ensure that all protected data is written successfully to storage before the corresponding data is subsequently destroyed.

In Step 227, it has been determined that the preserved pages are to be freed iteratively. Accordingly, the subsequent operating system iteratively destroys each page and returns the corresponding memory to the free list. In one or more embodiments of the invention, between iterations, the subsequent operating system may execute other unrelated routines.

In Step 229, it has been determined that the preserved pages are to be freed simultaneously. Accordingly, the subsequent operating system destroys all preserved pages in one continuous process and returns all corresponding memory to the free list.

While the various steps in this flowchart are presented and described sequentially, one of ordinary skill will appreciate that some or all of the steps may be executed in different orders, may be combined or omitted, and some or all of the steps may be executed in parallel.

The following example is for explanatory purposes only and not intended to limit the scope of the invention. Suppose that an initial operating system executing on a webserver having 20 GB of physical memory detects a fatal system error preventing the initial operating system from safely continuing operation. The initial operating system halts all ancillary processes and writes a preservation list to memory including physical memory addresses for all pages that require preservation for a deferred system dump. The preservation list includes all memory addresses between 500 MB and 600 MB, all memory addresses between 1 GB and 5 GB, and all memory addresses between 19 GB and 20 GB.

The initial operating system determines that 2 GB of free memory are required in order to boot a subsequent operating system. The initial operating system further determines that, excluding the address space of the initial operating system and the memory indicated in the preservation list, there are greater than 2 GB of free memory available for allocation. Accordingly, the initial operating system begins relocating preservable pages from the lower and upper ranges of physical memory to a middle range. The initial operating system has instructions to relocate all pages having physical memory addresses below 1 GB, and all pages having addresses above 19 GB, to new addresses between 1 GB and 19 GB. This ensures that preliminary routines of the subsequent operating system configured to write to lower and upper physical memory address ranges do not overwrite preservable pages. Once all qualifying pages are relocated, the initial operating system updates the preservation list with the new addresses.

The initial operating system transfers control of the computer system to a subsequent operating system, passing the updated preservation list. Specifically, the in-kernel boot loader loads the boot image for the subsequent operating system and executes the initial bootup routine. The updated preservation list can be passed as a memory object, or as a reference to a memory object in physical memory or on a storage device.

The subsequent operating system accesses the preservation list and assigns all preserved pages from the preservation list to address segments in the subsequent operating system's address space. The subsequent operating system performs an analysis on the preserved pages and determines that the kernel panic was caused by an unknown error, and that all preserved data should be dumped for full diagnostics. Accordingly, the subsequent operating system writes all preserved pages to a storage device.

Because the subsequent operating system is executing on a webserver with heavy traffic, it is desirable to for the subsequent operating system to have all necessary processes up and running with as little latency as possible. Consequently, the subsequent operating system determines that the preserved pages should be freed iteratively while the subsequently operating system continues to come on line. As each page is freed, the corresponding memory becomes available for additional processes of the subsequent operating system to begin execution.

Figure 3:
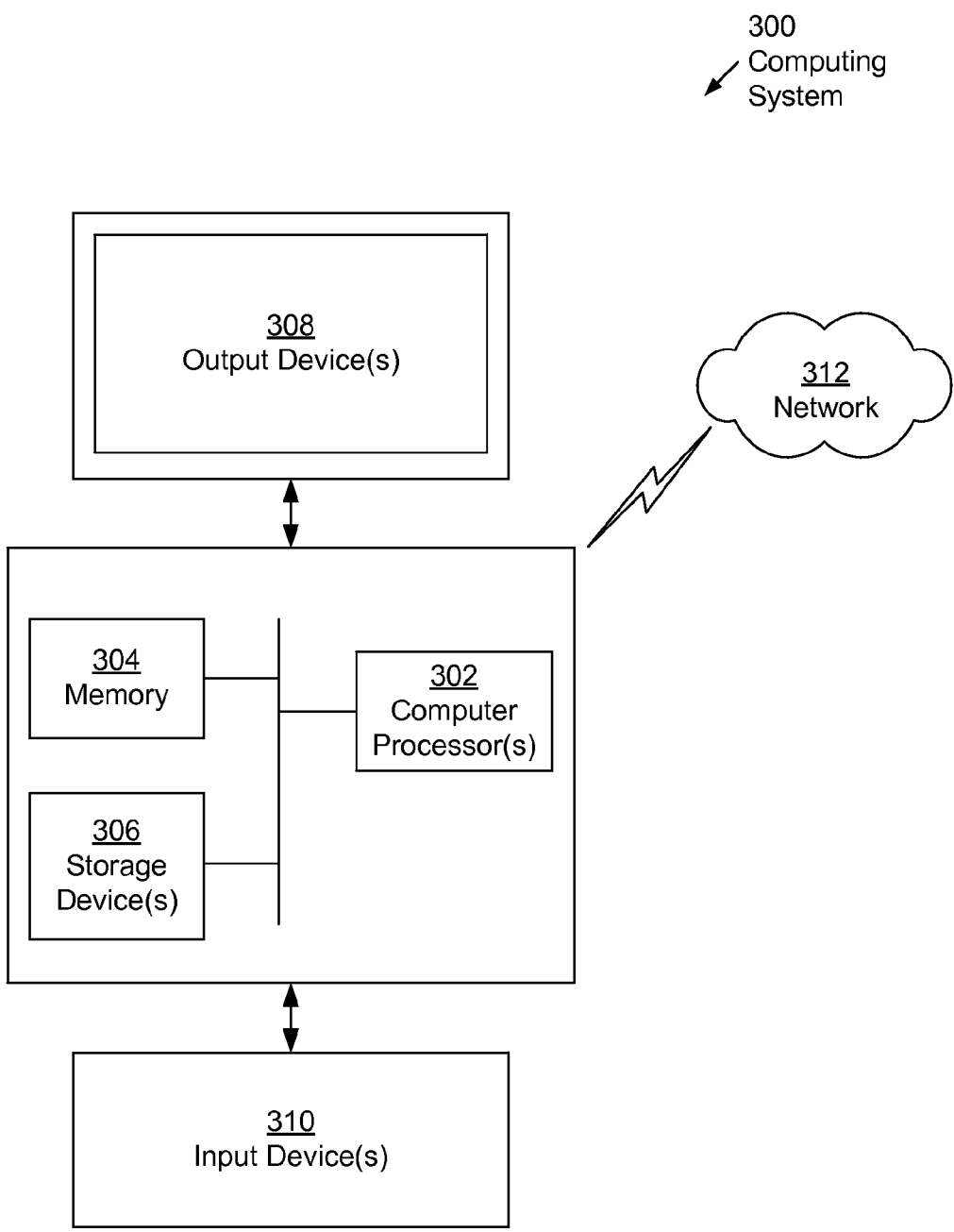
FIG. 3 shows a computing system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 3, the computing system (300) may include one or more computer processor(s) (302), associated memory (304) (e.g., random access memory (RAM), cache memory, flash memory, etc.), one or more storage device(s) (306) (e.g., a hard disk, an optical drive such as a compact disk (CD) drive or digital versatile disk (DVD) drive, a flash memory stick, etc.), and numerous other elements and functionalities. The computer processor(s) (302) may be an integrated circuit for processing instructions. For example, the computer processor(s) may be one or more cores, or micro-cores of a processor. The computing system (300) may also include one or more input device(s) (310), such as a touchscreen, keyboard, mouse, microphone, touchpad, electronic pen, or any other type of input device. Further, the computing system (300) may include one or more output device(s) (308), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (300) may be connected to a network (312) (e.g., a local area network (LAN), a wide area network (WAN) such as the Internet, mobile network, or any other type of network) via a network interface connection (not shown). The input and output device(s) may be locally or remotely (e.g., via the network (312)) connected to the computer processor(s) (302), memory (304), and storage device(s) (306). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (300) may be located at a remote location and connected to the other elements over a network (312). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for performing a deferred system dump, comprising:
    generating, when a fatal error is detected and by an initial operating system, a preservation list comprising a plurality of physical memory addresses of physical memory allocated to a plurality of pages, the initial operating system executing on a computer system, and the preservation list corresponding to a state of the computer system when the fatal error is detected;
    storing the preservation list;
    identifying a first subset of the plurality of pages, wherein each page of the first subset is at least partially allocated below a first physical memory address;
    relocating the first subset of the plurality of pages to a plurality of new physical memory addresses above the first physical memory address;
    updating the preservation list with the new physical memory addresses;
    transferring control of the computer system from the initial operating system to a subsequent operating system, wherein the subsequent operating system accesses the preservation list to identify a plurality of preserved pages, wherein transferring control comprises passing, by the initial operating system to the subsequent operating system, a reference to the preservation list;
    assigning each of the plurality of preserved pages to an address segment in an address space of the subsequent operating system;
    performing, on the plurality of preserved pages, a pre-dump analysis based on thread deep probing;
    excluding, based on the pre-dump analysis, a first subset of preserved pages from the plurality of preserved pages to obtain a second subset of the plurality of preserved pages;
    storing the second subset of the plurality of preserved pages; and
    freeing the plurality of preserved pages.

2. The method of claim 1, further comprising:
    identifying a third subset of the plurality of pages, wherein each page of the third subset is at least partially allocated above a second physical memory address; and
    relocating the third subset of the plurality of pages to new physical memory address ranges between the first physical memory address and the second physical memory address.

3. The method of claim 1, further comprising:
    detecting the fatal error, wherein control of the computer system is transferred to the subsequent operating system in response to detecting the fatal error.

4. The method of claim 1, further comprising:
    receiving a reboot command, wherein control of the computer system is transferred to the subsequent operating system in response to receiving the reboot command.

5. The method of claim 1, wherein the plurality of preserved pages are freed simultaneously.

6. The method of claim 1, wherein the plurality of preserved pages are freed iteratively.

7. A computer system, comprising:
    a processor;
    an initial operating system executing on the processor and configured to:
        generate, when a fatal error is detected, a preservation list comprising a plurality of physical memory addresses of physical memory allocated to a plurality of pages, wherein the preservation list corresponds to a state of the computer system when the fatal error is detected;
        store the preservation list,
        identify a first subset of the plurality of pages, wherein each page of the first subset is at least partially allocated below a first physical memory address,
        relocate the first subset of the plurality of pages to a plurality of new physical memory addresses above the first physical memory address, update the preservation list with the new physical memory addresses, and transfer control of the computer system, wherein transferring control comprises passing a reference to the preservation list; and a subsequent operating system executing on the processor and configured to:

receive control of the computer system, wherein receiving control comprises receiving the reference to the preservation list, access the preservation list to identify a plurality of preserved pages, assign each of the plurality of preserved pages to an address segment in an address space of the subsequent operating system, perform, on the plurality of preserved pages, a pre-dump analysis based on thread deep probing, exclude, based on the pre-dump analysis, a first subset of preserved pages from the plurality of preserved pages to obtain a second subset of the plurality of preserved pages, store the second subset of the plurality of preserved pages, and free the plurality of preserved pages.

8. The system of claim 7, wherein the initial operating system is further configured to:

identify a third subset of the plurality of pages, wherein each page of the third subset is at least partially allocated above a second physical memory address; and relocate the third subset of the plurality of pages to new physical memory address ranges between the first physical memory address and the second physical memory address.

9. The system of claim 7, wherein the initial operating system is further configured to:

detect the fatal error, wherein control of the computer system is transferred to the subsequent operating system in response to detecting the fatal error.

10. The system of claim 7, wherein the initial operating system is further configured to:

receive a reboot command, wherein control of the computer system is transferred to the subsequent operating system in response to receiving the reboot command.

11. The system of claim 7, wherein the plurality of preserved pages are freed simultaneously.

12. The system of claim 7, wherein the plurality of preserved pages are freed iteratively.

13. A non-transitory computer readable medium for performing a deferred system dump, comprising instructions for:

generating, when a fatal error is detected and by an initial operating system, a preservation list comprising a plurality of physical memory addresses of physical memory allocated to a plurality of pages, the initial operating system executing on a computer system, and the preservation list corresponding to a state of the computer system when the fatal error is detected;

storing the preservation list;

identifying a first subset of the plurality of pages, wherein each page of the first subset is at least partially allocated below a first physical memory address;

relocating the first subset of the plurality of pages to a plurality of new physical memory addresses above the first physical memory address;

updating the preservation list with the new physical memory addresses;

transferring control of the computer system from the initial operating system to a subsequent operating system, wherein the subsequent operating system accesses the preservation list to identify a plurality of preserved pages, wherein transferring control comprises passing, by the initial operating system to the subsequent operating system, a reference to the preservation list;

assigning each of the plurality of preserved pages to an address segment in an address space of the subsequent operating system;

performing, on the plurality of preserved pages, a pre-dump analysis based on thread deep probing;

excluding, based on the pre-dump analysis, a first subset of preserved pages from the plurality of preserved pages to obtain a second subset of the plurality of preserved pages;

storing the second subset of the plurality of preserved pages; and freeing the plurality of preserved pages.

14. The non-transitory computer readable medium of claim 13, further comprising instructions for:

identifying a third subset of the plurality of pages, wherein each page of the third subset is at least partially allocated above a second physical memory address; and relocating the third of the plurality of pages to new physical memory address ranges between the first physical memory address and the second physical memory address.

15. The non-transitory computer readable medium of claim 13, further comprising instructions for:

detecting the fatal error, wherein control of the computer system is transferred to the subsequent operating system in response to detecting the fatal error.

16. The non-transitory computer readable medium of claim 13, further comprising instructions for:

receiving a reboot command, wherein control of the computer system is transferred to the subsequent operating system in response to receiving the reboot command.

17. The non-transitory computer readable medium of claim 13, wherein the plurality of preserved pages are freed simultaneously.

18. The non-transitory computer readable medium of claim 13, wherein the plurality of preserved pages are freed iteratively.

* * * * *